(12) United States Patent
Stafford et al.

(10) Patent No.: US 7,711,351 B2
(45) Date of Patent: May 4, 2010

(54) ADVICE OF CHARGE FOR INTERNET PROTOCOL MULTIMEDIA SUBSYSTEM SERVICES WITHOUT UTILIZING AN APPLICATION SERVER

(75) Inventors: Matthew Stafford, Austin, TX (US); Nhan Thanh Tran, Lawrenceville, GA (US)

(73) Assignee: Cingular Wireless II LLC, Atlanta, GA (US)

( * ) Notice: Subject to any disclaimer, the term of this patent is extended or adjusted under 35 U.S.C. 154(b) by 1070 days.

(21) Appl. No.: 11/205,459

(22) Filed: Aug. 17, 2005

(65) Prior Publication Data

US 2007/0053330 A1 Mar. 8, 2007

(51) Int. Cl.
*H04M 11/00* (2006.01)

(52) U.S. Cl. .............. 455/406; 455/403; 455/405; 455/435.1

(58) Field of Classification Search .......... 455/406, 455/403, 405, 435.1; 709/229
See application file for complete search history.

(56) References Cited

U.S. PATENT DOCUMENTS

2003/0018558 A1* 1/2003 Heffner et al. ............... 705/37
2003/0152039 A1* 8/2003 Roberts ...................... 370/255
2004/0125755 A1* 7/2004 Roberts ...................... 370/259
2004/0185826 A1* 9/2004 Koskinen et al. ............ 455/406
2004/0196816 A1* 10/2004 Koskinen et al. ............ 370/338
2005/0003837 A1 1/2005 Midkiff et al. .............. 455/466
2006/0212511 A1* 9/2006 Garcia-Martin ............. 709/203

* cited by examiner

*Primary Examiner*—Joseph H Feild
*Assistant Examiner*—Huy D Nguyen
(74) *Attorney, Agent, or Firm*—Woodcock Washburn LLP

(57) ABSTRACT

Advice of charge information is provided utilizing the session initiation protocol (SIP) in an Internet protocol multimedia subsystem without utilizing an application server. The advice of charge message is provided to a user via the serving call/session control function and the home subscription server. When a request for a service is received by the serving call/session control function, the state of a binary, Boolean flag associated with the originator of the request is analyzed. Depending upon the state of the flag, either the request is routed to its intended destination, or an advice of charge message is routed to originating user, advising the user of the charge for the requested service. If the user accepts the charge, the serving call/session control function transmits the request for routing to the intended destination, and the flag is toggled. If the user declines the charge, the call is ended.

21 Claims, 6 Drawing Sheets

ADVICE OF CHARGE FOR INTERNET PROTOCOL MULTIMEDIA SUBSYSTEM SERVICES WITHOUT UTILIZING AN APPLICATION SERVER

TECHNICAL FIELD

The technical field relates generally to Internet Protocol Multimedia subsystem (IMS) services in a wireless or wireline telephone network and more specifically to providing advice of charge (AoC) messages in an IMS without utilizing an application server (AS).

BACKGROUND

New services continuously are being added to existing wireless communications systems. Some of the most popular services are related to providing and receiving multimedia via mobile equipment, such as mobile telephones, personal digital assistants (PDAs) (or similar/related hand held devices such as PBX wireless devices), SIP phones, and lap top computers. Many of these services are provided via the Internet protocol multimedia subsystem (IMS) conceptualized by the 3GPP standards body. Typically, when a new service is introduced into a wireless network system, few customers are subscribers to the new service. Thus, service providers tend to allow users to pay for services as used. Such pay-per-use functionality allows users to get acquainted with a service before deciding to subscribe.

Users prefer to know how much a service will cost before using the service. Accordingly, some service providers provide the cost of a service to a non-subscribed user when the user requests the service before actually providing the service. The user then has the opportunity to accept or decline the service. Providing the cost for a one time use of a service before the service is provided often is referred to as "Advice of Charge," or AoC.

Wireless and wireline communications systems too, continuously are being updated. Although the industry specifications for IMS are being developed within the industry standards, the realization of IMS has not truly matured. Thus, all desired features and/or specialized system functions have not been clearly defined/developed. This creates a challenge for carriers attempting to deploy IMS systems in which not all new systems and not all system upgrades are compatible with all new services. For example, not all IMSs are configured with the same components, and not all IMS services utilize the same components. Some IMS-based services comprise a component known as an application server (AS) as specified in the 3GPP standards. In services comprising an AS, the AS may support access to services by non-subscribed users. In this case, it would be natural for the AS to provide AoC functionality to a user. However, not all IMS-based services comprise an AS.

SUMMARY

In an Internet protocol multimedia subsystem (IMS) without utilizing an application server (AS), advice of charge (AoC) information is provided utilizing the session initiation protocol (SIP). In an exemplary embodiment, the AoC is provided to a user via the serving call/session control function (S-CSCF) and the home subscription server (HSS). When a request for a service is received by the S-CSCF, the state of a binary, Boolean flag associated with the originator of the request is analyzed. The flag is stored in the HSS. The flag is set to either a true state or a false state. A false state indicates that the user is a subscriber to the requested service, or that the user previously has been advised of the charge for the requested service and has accepted the charge. A true state indicates that the user is to be provided an AoC message. If the flag is false, the request for the service is routed to the appropriate destination. If the flag is true, the appropriate AoC message is provided to the user. The user can either accept or decline the charge. If the user accepts the charge, the S-CSCF transmits the request for routing to the intended destination, and the flag in the HSS is set to false (i.e., the flag is toggled). If the user declines the charge, the call is ended.

BRIEF DESCRIPTION OF THE DRAWINGS

The foregoing and other objects, aspects and advantages will be better understood from the following detailed description with reference to the drawings, in which:

FIG. 2 is a block diagram of an exemplary processor and system for providing AoC messages via an IMS without utilizing an AS;

FIG. 6 is a flow diagram of an exemplary process for providing an advice of charge message in an IMS without utilizing an AS.

DETAILED DESCRIPTION OF ILLUSTRATIVE EMBODIMENTS

Advice of charge (AoC) messages are provided to users of Internet protocol multimedia subsystem (IMS) services in an IMS, wherein an application server (AS) is not utilized to provide the AoC message. The IMS may not have an AS, the AS may be non/mal-functioning AS, the AS may be functioning normally, or a combination thereof. The AoC messages are provided by the serving call session control function (S-CSCF) and the home subscription server (HSS) utilizing the session initiation protocol (SIP).

The IMS is an open, standardized, multimedia architecture for mobile and fixed services. IMS merges the Internet with mobile communications. The IMS utilizes the standard Internet protocol (IP) and 3rd Generation Partnership Project (3GPP) variant of SIP. The IMS allows the combination of voice, video and data services in a single packet switched network to offer network controlled multimedia services.

Figure 1:
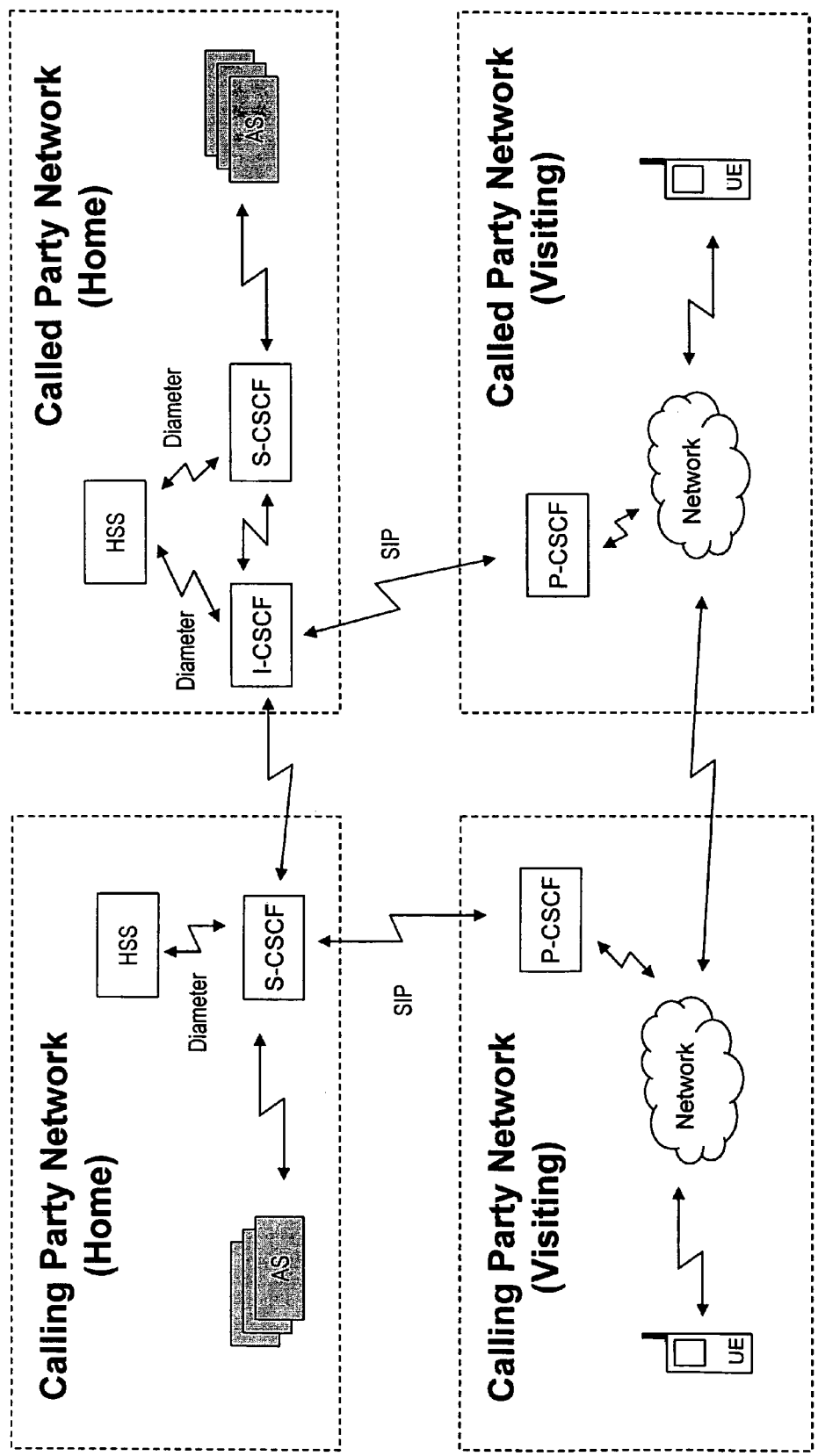
FIG. 1 is a block diagram of a subset of an IMS.

FIG. 1 is a block diagram of a subset of an IMS. The subset of the IMS comprises one or more user databases, referred to as home subscriber servers, HSSs, one or more SIP servers, referred to as the call/session control function, CSCF, and one or more application servers (AS). User equipment, UE, for a calling party and a called party are also depicted in FIG. 1. The HSS communicates with the CSCF via the Diameter protocol utilizing the Cx and/or the Dx interfaces.

The CSCF can comprise a proxy CSCF (P-CSCF), an interrogating CSCF (I-CSCF), a serving CSCF (S-CSCF), or a combination thereof. A P-CSCF is capable of inspecting all messages going into or out of the CSCF. The P-CSCF can authenticate a user and establish IP security. The P-CSCF can compress and decompress messages. An I-CSCF queries the HSS to retrieve the user location, and route a request to its assigned S-CSCF. An I-CSCF can also encrypt part of a message. An S-CSCF is the central signaling node of the CSCF. The S-CSCF downloads and uploads user profiles to and from the HSS. The S-CSCF too, is capable of inspecting all messages going into or out of the CSCF. The S-CSCF decides to which AS a message is forwarded. The various portions of the CSCF communicate with each other in accordance with the session initiation protocol (SIP).

An AS hosts and executes services. An AS can operate in SIP proxy mode, SIP user agent mode, or SIP back to back user agent mode. An AS can be located in a home network or an external network. If located in a home network, the AS can query the HSS.

The SIP is a protocol for setting up sessions between one of more clients. Many features in SIP are similar to features present in signaling system 7 (SS7). The SIP functions as a carrier for the session description protocol which describes the media content of a session, such as what IP ports to use and the codec being used, for example. The SIP is a peer to peer protocol. Thus, many SIP features are implemented in communicating endpoints rather than in a network. As a peer to peer protocol, SIP does not require any intervening SIP infrastructure. However, as a practicality, SIP utilizes proxy and registrar network elements.

Figure 2:
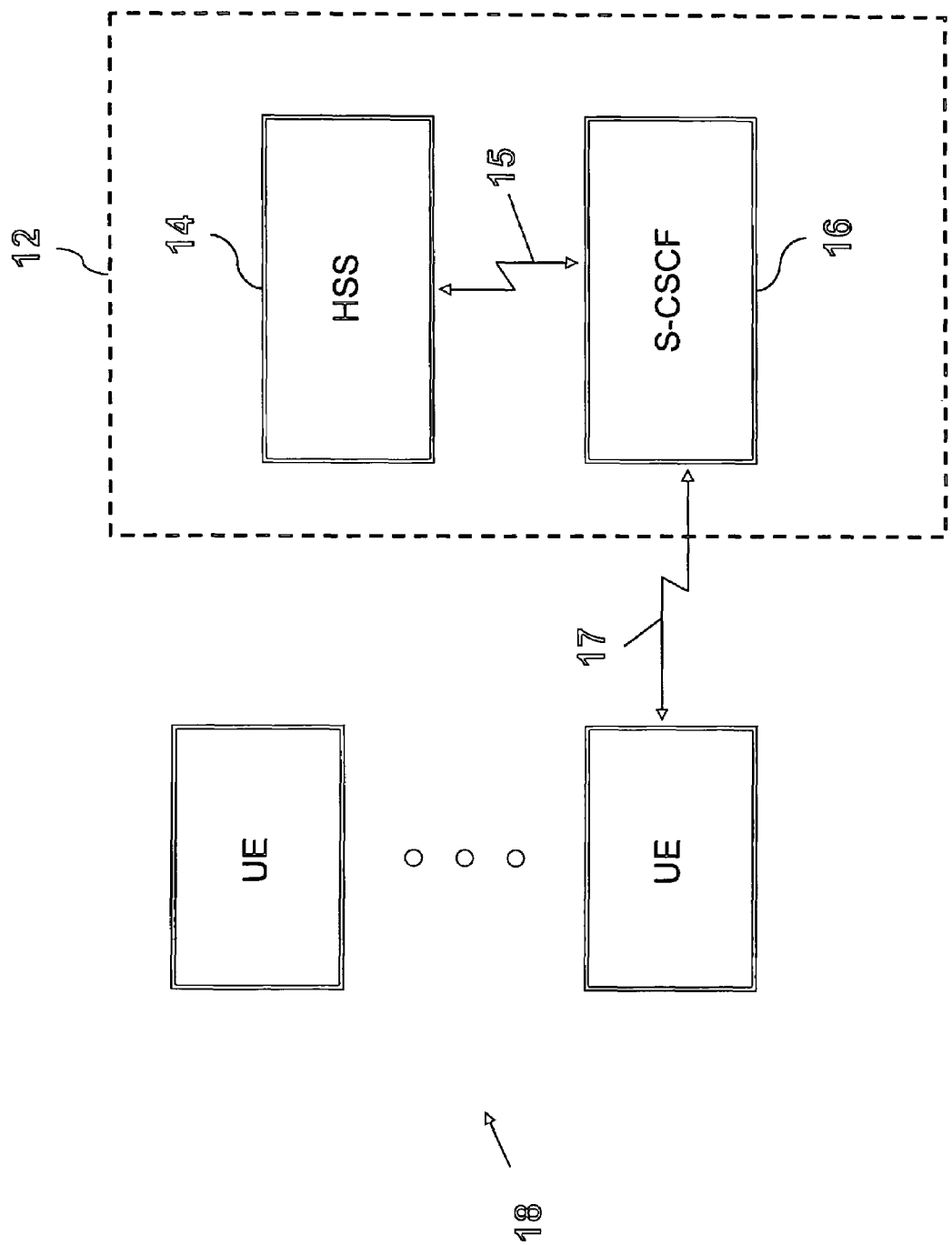

FIG. 2 is a block diagram of an exemplary processor and system for providing AoC messages via an IMS without utilizing an AS. The system depicted in FIG. 2 does not contain an AS. The system depicted in FIG. 2 comprises a processor 12 for providing AoC messages via an IMS without utilizing AS, an HSS 14, an S-CSCF 16, and at least one user equipment (UE) 18. It is emphasized that the block diagram depicted in FIG. 2 is exemplary and not intended to imply a specific implementation. Thus, the processor 14 can be implemented in a single processor, such as a computer, or multiple processors. Multiple processors can be distributed or centrally located. Multiple processors can communicate wirelessly, via hard wire, or a combination thereof. For example, each portion of the processor 12 can be implemented via multiple distributed processors or nodes.

The user equipment 18 can comprise any appropriate user equipment 18 capable of communicating with the processor 12. Examples of appropriate user equipment 18 include mobile telephones, personal digital assistants (PDAs), lap top computers, handheld processors, SIP phones, or a combination thereof. In an exemplary embodiment, the user equipment 18 communicates with the processor 12 via interface 17 and the S-CSCF 16. The communication interface 17 can be a wireless interface, a wired interface, or a combination thereof. The interface 17 between the user equipment 18 and the S-CSCF 16 can be in accordance with any appropriate protocol. In an exemplary embodiment, the protocol for the interface 17 between the user equipment 18 and the S-CSCF 16 is in accordance with the SIP. The interface 17 between the user equipment 18 and the S-CSCF 16 can be direct, via at least one node, or a combination thereof. For example, the user equipment can send a message from a mobile phone, and the message can be routed to the processor 12 via a gateway server of a wireless communications network.

The processor 12 comprises an HSS 14 and an S-CSCF 16. The HSS 14 is a database, or group of databases, that has stored therein information pertaining to subscribers of the IMS. The S-CSCF downloads and uploads user/subscriber information (e.g., user profiles) to and from the HSS 14. Interface 15 between the HSS 14 and the S-CSCF 16 can a wireless or wired interface. The interface 15 between the HSS 14 and the S-CSCF 16 can be direct, via at least one node, or a combination thereof. The interface 15 between the S-CSCF and the HSS 14 can be in accordance with any appropriate protocol. In an exemplary embodiment, the protocol for interface 15 between the HSS 14 and the S-CSCF 16 is in accordance with the Diameter protocol. The Diameter protocol is an Authentication, Authorization, and Accounting (AAA) protocol for applications such as network and Internet access.

In an exemplary scenario, a user requests a video segment to be downloaded from the Internet to her mobile telephone (UE 18). The request is routed to the S-CSCF 16. The S-CSCF 16 queries the HSS 14 as to the status of the user and the request. (As described in more detail below, in another exemplary embodiment, user information can be downloaded to the S-CSCF when the user is registered with the network. And accordingly, the S-CSCF would not query the HSS in response to the user's request.) The HSS 14 has stored therein information about the charge for the requested service. In an exemplary embodiment, the HSS 14 has stored therein a text message to be sent as part of the AoC message. The text message can comprise, for example, a text string pertaining to the charge, such as whether the price is per Mega pixel, per use, or the like.

The HSS 14 also has stored therein a flag indicating that the user should be sent an AoC message, or that an AoC message is not necessary and that the request should be routed to an appropriate destination. If the flag indicates that the user does not need an AoC message, the request is appropriately routed. If the flag indicates that the user should be sent an AoC message, the charge information, including the charge for the requested service, is sent to the S-CSCF 16 from the HSS 14. The AoC message, informing the user of the charge for the requested service, is sent to the user's mobile telephone from the S-CSCF 16. At this point, the user can either accept or decline the charge. If the user declines the charge, the call is ended. If the user accepts the charge, a response is sent to the S-CSCF 16 from the user's mobile telephone, and the request is routed to the appropriate destination.

The AoC flag stored in the HSS 14 is a binary, Boolean flag. As such, it can be one of only two states: true or false. By exemplary convention herein, a true state is an indication that the AoC message should be sent to the requester, and a false state is an indication that the AoC message need not be sent. It is emphasized that this convention is exemplary. That is, in another embodiment, a true state could be an indication that the AoC message need not be sent to the requester, and a false state could an indication that the AoC message should be sent.

An AoC flag can be set to false (indicating that the AoC message need not be sent) for various reasons. For example, the user could be a current subscriber to the service or the user previously could have been advised of and accepted the charge. The AoC flag would be set to true (indicating that the AoC message should be sent) if there is no record of the requesting user being a current subscriber or that the user previously has accepted the charge. For example, a user can request a service, receive an AoC message, and decline the charge. The user later can request the same service, and because the user previously did not accept the charge, the AoC message will be sent to the user via the HSS 14 and the S-CSCF 16.

Figure 3:
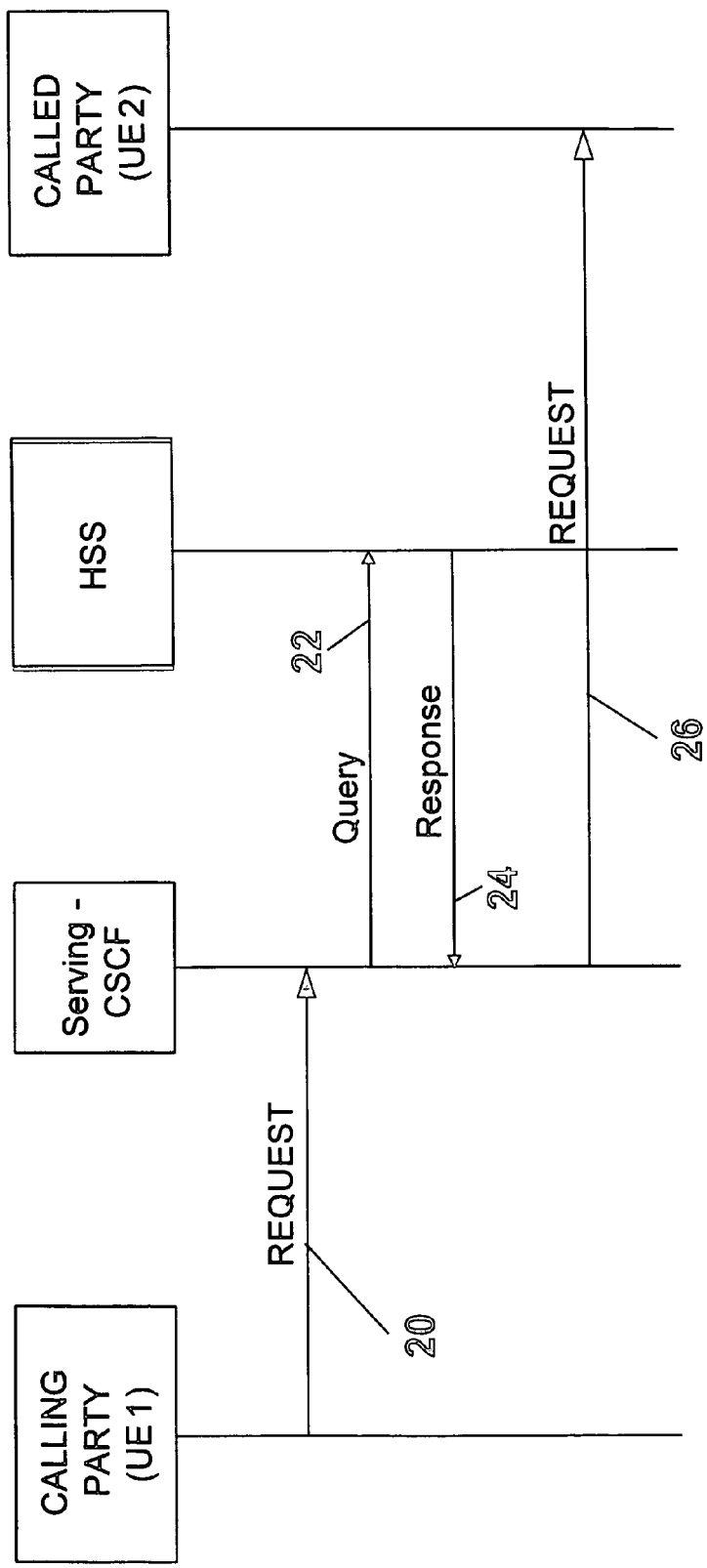
FIG. 3 is a sequential flow diagram of an exemplary sequence of events for requesting access to a service, wherein an AoC message is not necessary.

As shown in FIG. 3, and other sequential diagrams depicted herein, the S-CSCF queries the HSS for AoC information responsive to receiving a request to access a service (for example see steps 22 and 24 of FIG. 3). However, in an exemplary embodiment, AoC information is obtained by the S-CSCF from the HSS when a user registers with a network, such as an IMS. Thus, when the S-CSCF receives from user equipment a request to access a service, the S-CSCF is not required, at that time, to query the HSS and wait for a response thereto. Instead, the S-CSCF can analyze its own memory (or query other processors/nodes) for AoC information. For purposes of consistency and completeness, sequential diagrams depicted herein illustrate the above query and response messages. It is to be understood however, that this represents an exemplary embodiment, and that in other exemplary embodiments, AoC information is obtained from the HSS when a user registers with a network.

FIG. 3 is a sequential flow diagram of an exemplary sequence of events for requesting access to a service, wherein an AoC message is not necessary. A user's request to access a service is transmitted for routing from the user's equipment (UE1) to the S-CSCF at step 20. The user's request, for example, can be a request to send an image from her mobile telephone to another mobile telephone (e.g., UE2). The S-CSCF analyzes the AoC flag (also referred to as the AoC parameter) to determine if the flag is set to true or false. In an exemplary embodiment, to accomplish this, the S-CSCF transmits for routing a query to the HSS at step 22 (if not obtained by the S-CSCF when user registered with the network). Accordingly, the HSS transmits for routing to the S-CSCF a response to the query at step 24. The response can contain any appropriate information. The S-CSCF, responsive to the AoC response, is capable of determining whether to initiate, or not, a billing mechanism to charge the user appropriately. For purposes of the scenario depicted in FIG. 3, the response contains at least an indication that the AoC flag is set to a state of false, indicating that it is not necessary to send to the originating user equipment (UE1) a message advising of the charge for the service. Responsive to the false state of the AoC flag, the S-CSCF transmits the request for routing to its intended destination, UE2, at step 26.

Figure 4:
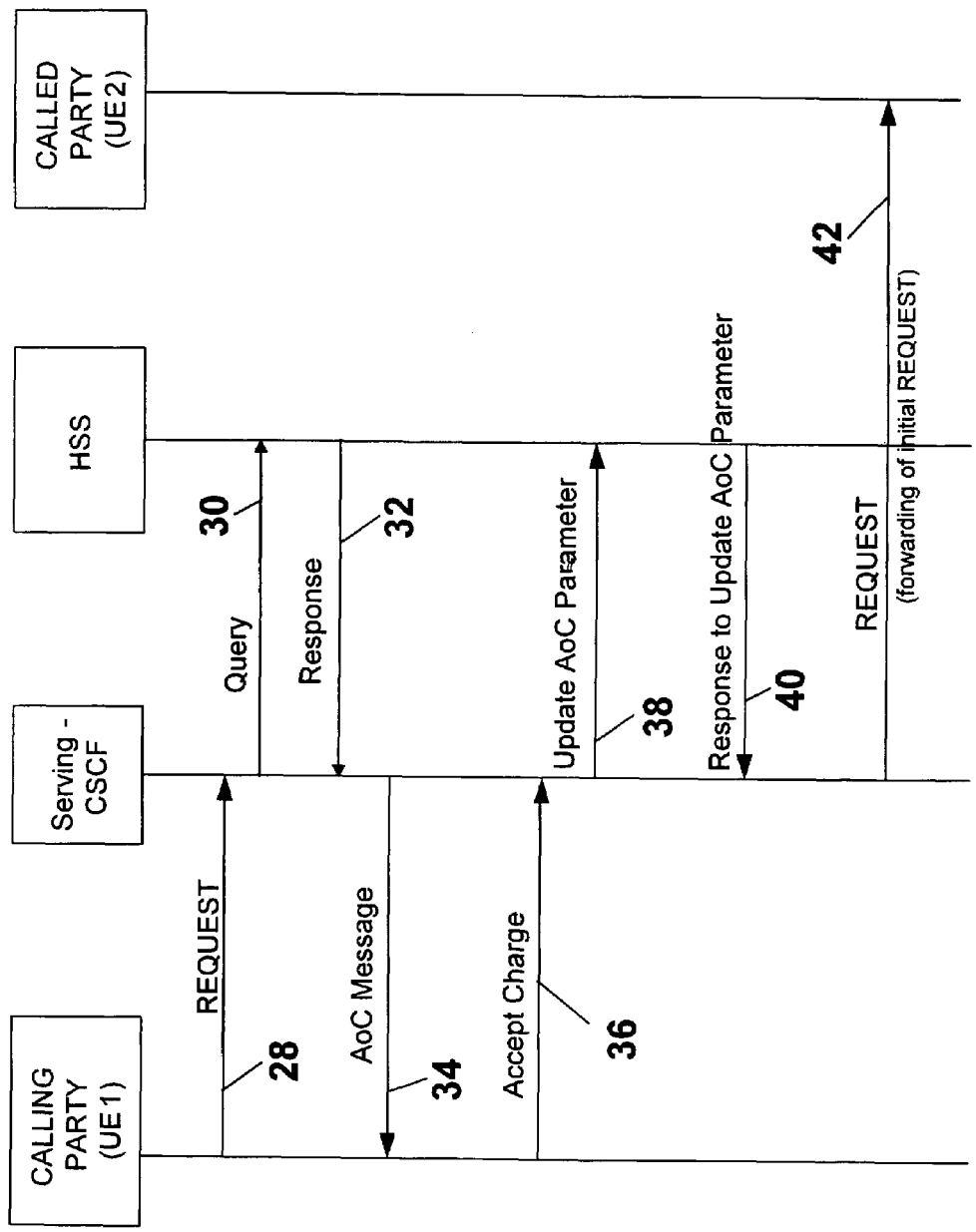
FIG. 4 is a sequential flow diagram of an exemplary sequence of events for requesting access to a service, wherein the charge is accepted.

FIG. 4 is a sequential flow diagram of an exemplary sequence of events for requesting access to a service, wherein the charge is accepted. A user's request to access a service is transmitted for routing from the user's equipment (UE1) to the S-CSCF at step 28. The S-CSCF analyzes the AoC flag to determine if the flag is set to true or false. To accomplish this, in an exemplary embodiment, the S-CSCF transmits for routing a query to the HSS at step 30 (if not obtained by the S-CSCF when user registered with the network). Accordingly, the HSS transmits for routing to the C-CSCF a response to the query at step 32. The response can contain any appropriate information. For purposes of the scenario depicted in FIG. 4, the response contains at least an indication that the AoC flag is set to true, indicating that an AoC message should be routed to the originating user equipment (UE1). The response also contains information pertaining to the charge for the requested service. The AoC message is transmitted for routing to the originating user equipment (UE1) at step 34. The AoC message can contain any appropriate information. For purposes of the scenario depicted in FIG. 4, the AoC message contains at least the charge for the requested service. At this point, the originating user can accept or decline the charge. In this scenario, the originating user accepts the charge, and a message indicating the user's acceptance is transmitted for routing to the S-CSCF at step 36.

Responsive to receiving the originating user's acceptance of the charge, the S-CSCF updates the AoC information stored in the HSS. To accomplish the update, the S-CSCF transmits an update AoC message for routing to the HSS at step 38. The AoC information stored in the HSS relates the originating user to the requested service. In various exemplary embodiments, the HSS can query other processors/nodes to obtain information. The update AoC message can include any appropriate information. For purposes of the scenario depicted in FIG. 4, the update AoC message contains at least a message to toggle the AoC flag associated with the particular user and the particular service. Thus, the AoC flag is toggled from true to false. The HSS transmits a response message to the S-CSCF at step 40 indicating that the AoC information for the particular user and the particular service has been updated. Responsive to receiving the response message from the HSS, the S-CSCF transmits the request (initial request of step 28) for routing to its intended destination, UE2, at step 42.

Figure 5:
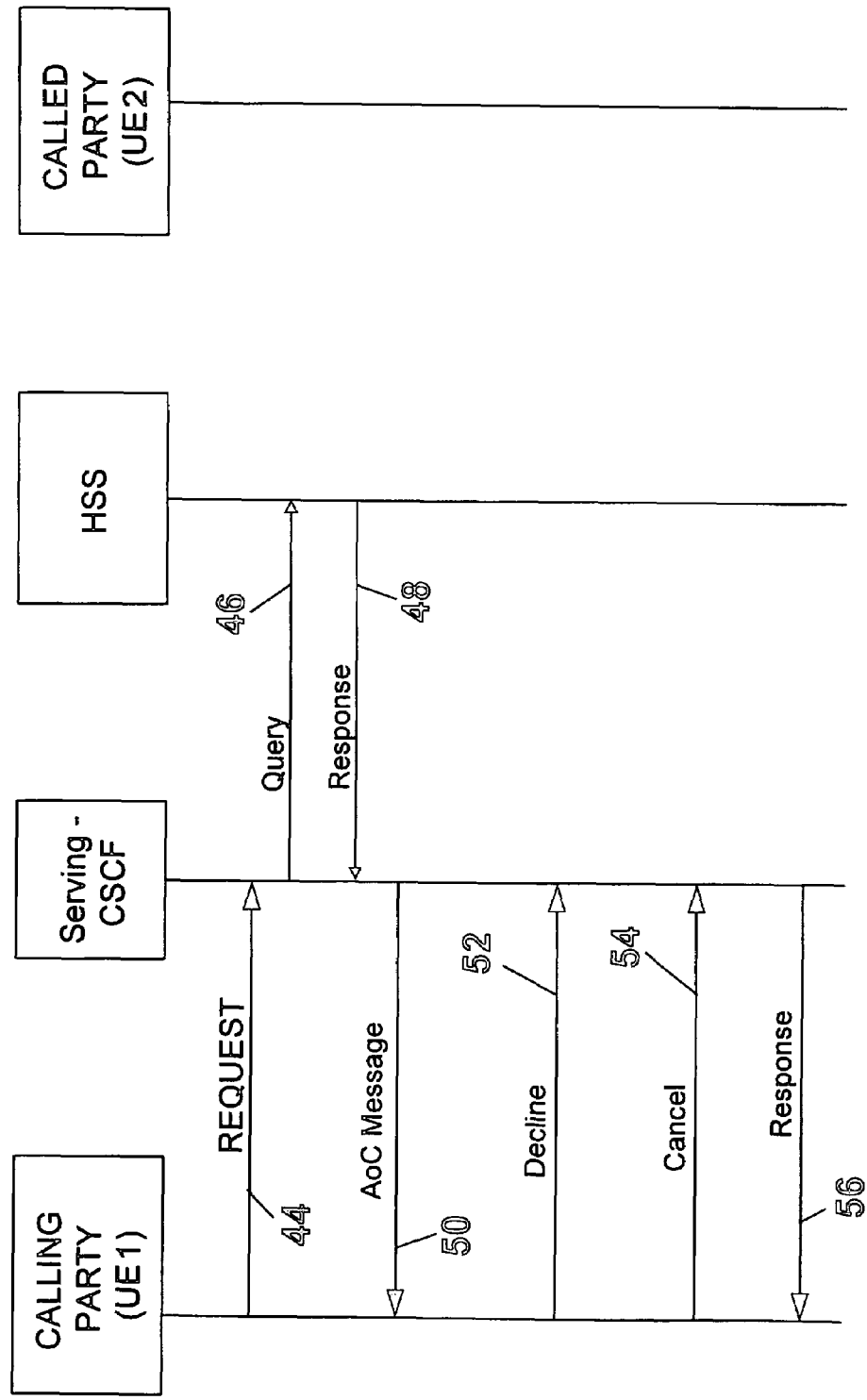
FIG. 5 is a sequential flow diagram of an exemplary sequence of events for requesting access to a service, wherein the charge is declined.

FIG. 5 is a sequential flow diagram of an exemplary sequence of events for requesting access to a service, wherein the charge is declined. A user's request to access a service is transmitted for routing from the user's equipment (UE1) to the S-CSCF at step 44. The S-CSCF analyzes AoC flag to determine if the flag is set to true or false. In an exemplary, to accomplish this, the S-CSCF transmits for routing a query to the HSS at step 46 (if not obtained by the S-CSCF when user registered with the network). Accordingly, the HSS transmits for routing to the C-CSCF a response to the query at step 48. The response can contain any appropriate information. For purposes of the scenario depicted in FIG. 5, the response contains at least an indication that the AoC flag is set to true, indicating that an AoC message should be routed to the originating user equipment (UE1). The response also contains information pertaining to the charge for the requested service. The AoC message is transmitted for routing to the originating user equipment (UE1) at step 50. The AoC message can contain any appropriate information. For purposes of the scenario depicted in FIG. 5, the AoC message contains at least the charge for the requested service. At this point, the originating user can accept or decline the charge. In this scenario, the originating user declines the charge, and a message indicating the user's declining of the charge is transmitted for routing to the S-CSCF at step 52.

Because the charge is declined, the S-CSCF does not update the AoC information stored in the HSS (or stored in the S-CSCF if obtained by the S-CSCF when the user registered with the network). The user equipment (UE1) transmits a message for routing to the S-CSCF indicating the request is canceled at step 54 and the S-CSCF responds to the cancellation message at step 56.

Figure 6:
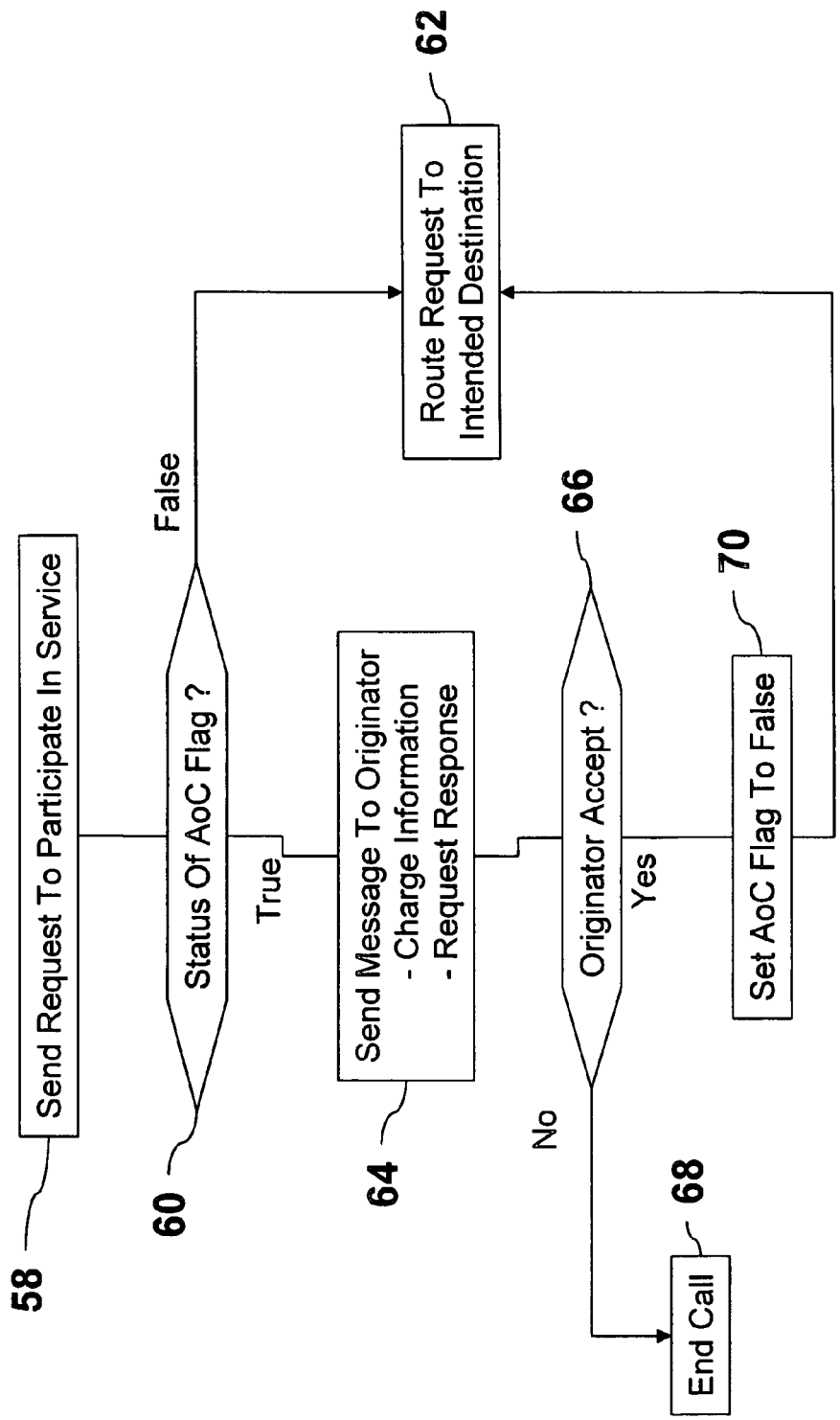

FIG. 6 is a flow diagram of an exemplary process for providing an advice of charge message in an IMS without utilizing an AS. A user requests to participate in a service at step 58. The status of the association between the user and the requested service is determined at step 60. This involves checking the AoC flag. At this point, the user could be a subscriber to the service or the user could previously have accepted or declined a charge for the service. If the AoC flag is set to false, indicating that an AoC message need not be sent to the user, the request to access the service is routed to the intended destination at step 62.

If, at step 60, it is determined that the state of the AoC flag is true, indicating that an AoC message should be sent to the user, an AoC message is routed to the user at step 64. The AoC message can comprise any appropriate information. In an exemplary embodiment, the AoC message comprises the charge for the requested service and a request for a response from the user as to whether the charge is accepted or declined. At this point, the user can either accept or decline the charge. If the user declines the charge, the call is ended at step 68. If the user accepts the charge, the AoC information is updated at step 70. This includes toggling the AoC flag. As shown in FIG. 6, the AoC flag is set to false, thus indicating that the next time the user requests access to this service, an AoC message need not be sent. The request is routed to the intended destination at step 62.

While exemplary embodiments of providing an AoC message in an IMS without utilizing an AS have been described in connection with various computing devices, the underlying concepts may be applied to any computing device or system capable of managing memory.

The various techniques described herein may be implemented in connection with hardware or software or, where appropriate, with a combination of both. Thus, the methods and apparatus for providing an AoC message in an IMS without utilizing an AS, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus for providing an AoC message in an IMS system without utilizing an AS may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While methods, apparatuses, and systems for providing an AoC message in an IMS without utilizing an AS have been described in connection with exemplary embodiments of the various figures, it is to be understood that other similar embodiments can be used or modifications and additions can be made to the described embodiments for performing the same function of the present invention without deviating therefrom.

What is claimed is:

1. A method for providing, in an Internet protocol multimedia subsystem (IMS) without utilizing an IMS application server (AS), notification of a charge for a service, said method comprising:
   receiving, without utilizing an IMS AS, a request to access a service;
   determining, without utilizing an IMS AS, a status in response to receiving said request, wherein the status indicates that an advice of charge (AoC) message is to be provided;
   in accordance with said status, without utilizing an IMS AS, providing the AoC message, wherein the AoC message comprises a notification of said charge for service.

2. A method in accordance with claim 1, said method further comprising:
   subsequent said act of providing said notification, receiving acceptance of said charge; and
   providing said request for routing to an intended destination.

3. A method in accordance with claim 1, wherein said status is indicative of one of:
   an originator of said request being a subscriber to said service;
   prior to said act of receiving, said originator accepted said charge; and
   said originator of said request not being a subscriber to said service.

4. A method in accordance with claim 3, further comprising:
   performing said act of providing said notification if said status is indicative of said originator not being a subscriber to said service; and
   performing an act of providing said request for routing if said status is indicative of one of:
      said originator of said request being a subscriber to said service; and
      said originator accepting said charge prior to said act of receiving.

5. A method in accordance with claim 1, wherein:
   said status is indicative of a flag being set to one of true and false;
   said act of providing said notification is performed if said flag is set to one of true and false; and
   an act of providing said request for routing to an intended destination is performed if said flag is set to the other one of true and false.

6. A method in accordance with claim 5, further comprising:
   subsequent to providing said notification, toggling said flag to an alternate state and performing said act of providing said request for routing, responsive to receipt of an indication that said charge is accepted.

7. A processor for providing, in an Internet protocol multimedia subsystem (IMS) without utilizing an IMS application server (AS), notification of a charge for a service, said processor comprising:
   a first processing portion, not being an IMS AS, for:
      receiving in a request to access a service;
      requesting a status from a second processing portion;
      receiving said status from said second processing portion, wherein the status indicates that an advice of charge (AoC) message is to be provided;
      in accordance with said status, providing the AoC message, wherein the AoC message comprises a notification of said charge for service;
   said second processing portion, not being an IMS AS, for:
      storing said status;
      receiving said request for status from said first processing portion; and
      providing said status to said first processing portion.

8. A processor in accordance with claim 7, wherein said first processor functions as a session initiation protocol (SIP) proxy for an AS.

9. A processor in accordance with claim 7, wherein said status is indicative of one of:
   an originator of said request for said service being a subscriber to said service;
   said originator previously accepting said charge; and
   said originator of said request for said service not being a subscriber to said service.

10. A processor in accordance with claim 7 wherein:
said first processing portion provides notification of said charge for said service if said status is indicative of an originator of said request for service not being a subscriber of said service;
said first procession portion provides said request for said service for routing to an intended destination if said status is indicative of one of:
said originator being a subscriber to said service; and
said originator accepting said charge.

11. A processor in accordance with claim 7, wherein said first processing portion comprises a serving call session control function (S-CSCF).

12. A processor in accordance with claim 7, wherein said second processing portion comprises a home subscription server (HSS).

13. A processor in accordance with claim 7, wherein said request for service originated from one of mobile telephone, a personal digital assistant (PDA), a hand held processor, an SIP phone, and a lap top computer.

14. A processor in accordance with claim 7, wherein:
said status is indicative of a flag being set to one of true and false;
said act of providing said notification is performed if said flag is set to one of true and false; and
an act of providing said request for routing to an intended destination is performed if said flag is set to the other one of true and false.

15. A processor in accordance with claim 14, wherein:
subsequent to providing said notification and responsive to receipt of an indication that said charge is accepted, said flag is toggled to an alternate state and said request is provided for routing.

16. A computer readable storage medium encoded with a computer program code for providing, in an Internet protocol multimedia subsystem (IMS) without utilizing an IMS application server (AS), notification of a charge for a service, said program code comprising:
a receive request code segment for receiving, without utilizing an IMS AS, a request to access a service;
a determine status code segment for determining, without utilizing an IMS AS, a status in response to receiving said request determining, without utilizing an IMS AS, a status in response to receiving said request, wherein the status indicates that an advice of charge (AoC) message is to be provided;
in accordance with said status, without utilizing an IMS AS,
a provide notification code segment for providing the AoC message, wherein the AoC message comprises a notification of said charge for service.

17. A computer readable storage medium in accordance with claim 16, said program code further comprising:
a receive acceptance code segment for, subsequent said act of providing said notification, receiving acceptance of said charge; and
a routing code segment for providing said request for routing to an intended destination.

18. A computer readable storage medium in accordance with claim 16, wherein said status is indicative of one of:
an originator of said request being a subscriber to said service;
prior to said act of receiving, said originator accepted said charge; and
said originator of said request not being a subscriber to said service.

19. A computer readable storage medium in accordance with claim 18, wherein:
said provide notification code segment performs said act of providing said notification if said status is indicative of said originator not being a subscriber to said service; and
a routing code segment performs an act of providing said request for routing to an intended destination if said status is indicative of one of:
said originator of said request being a subscriber to said service; and
said originator accepting said charge prior to said act of receiving.

20. A computer readable storage medium in accordance with claim 16, wherein:
said status is indicative of a flag being set to one of true and false;
said act of providing said notification is performed if said flag is set to one of true and false; and
an act of providing said request for routing to an intended destination is performed if said flag is set to the other one of true and false.

21. A computer readable storage medium in accordance with claim 20, said program code further comprising:
a toggle code segment for, subsequent to providing said notification, toggling said flag to an alternate state and performing said act of providing said request for routing, responsive to receipt of an indication that said charge is accepted.

* * * * *